US012546655B2

(12) United States Patent
Yamada et al.

(10) Patent No.: US 12,546,655 B2
(45) Date of Patent: Feb. 10, 2026

(54) INTERFEROMETER

(71) Applicant: SEIKO EPSON CORPORATION, Tokyo (JP)

(72) Inventors: Kohei Yamada, Shiojiri (JP); Tetsuro Matsumoto, Chino (JP)

(73) Assignee: SEIKO EPSON CORPORATION (JP)

( * ) Notice: Subject to any disclaimer, the term of this patent is extended or adjusted under 35 U.S.C. 154(b) by 97 days.

(21) Appl. No.: 18/672,380

(22) Filed: May 23, 2024

(65) Prior Publication Data
US 2024/0393180 A1 Nov. 28, 2024

(30) Foreign Application Priority Data

May 24, 2023 (JP) ................ 2023-085219

(51) Int. Cl.
*G01J 3/45* (2006.01)
*G01B 21/02* (2006.01)
*G01J 3/453* (2006.01)

(52) U.S. Cl.
CPC ............ *G01J 3/4535* (2013.01); *G01B 21/02* (2013.01)

(58) Field of Classification Search
CPC .......... G01J 3/45; G01J 3/4535; G01B 21/02; G01B 9/02; G01B 9/02044; G01B 9/0209;

(Continued)

(56) References Cited

U.S. PATENT DOCUMENTS

2006/0055939 A1\* 3/2006 Akiba ................ G01B 11/2441
356/497
2012/0038930 A1\* 2/2012 Sesko .................. G01B 11/026
356/486

(Continued)

FOREIGN PATENT DOCUMENTS

JP H02-187647 A 7/1990
JP H06-294904 A 10/1994

(Continued)

*Primary Examiner* — Abdullahi Nur
(74) *Attorney, Agent, or Firm* — Harness, Dickey & Pierce, P.L.C.

(57) ABSTRACT

An interferometer including an analysis unit and a length measurement unit, wherein the analysis unit includes an analysis optical system that includes a first light source configured to emit an analysis light, a moving mirror that reflects the analysis light, and a first light receiving element that receives the analysis light, and is used for analysis of the sample using interference of the analysis light, and a mirror drive unit that drives the moving mirror based on a mirror drive signal, the length measurement unit includes a length measurement optical system that includes a laser source, a light modulator that adds a modulation component by modulating a frequency of the laser beam using a vibrating element, and a second light receiving element that receives the laser beam including the length measurement component and the modulation component generated when the moving mirror is irradiated with the laser beam, and outputs a second received light signal, and is used for detection of a position of the moving mirror using interference of the laser beam, and the vibrating element is a signal source of the mirror drive signal.

7 Claims, 10 Drawing Sheets

(58) Field of Classification Search
CPC ............ G01B 9/02091; G01B 9/02015; G01B 9/02029; G01B 11/2441; G02B 26/001; G02B 26/0816; G02B 26/0841
See application file for complete search history.

(56) References Cited

U.S. PATENT DOCUMENTS

2016/0231172 A1* 8/2016 Medhat .............. G02B 26/0841
2020/0124479 A1 4/2020 Suzuki et al.

FOREIGN PATENT DOCUMENTS

JP 2000-131514 A 5/2000
WO 2019-009404 A1 1/2019

* cited by examiner

INTERFEROMETER

The present application is based on, and claims priority from JP Application Serial Number 2023-085219, filed May 24, 2023, the disclosure of which is hereby incorporated by reference herein in its entirety.

BACKGROUND

1. Technical Field

The present disclosure relates to an interferometer.

2. Related Art

WO 2019/009404 discloses an optical module used for a spectroscopic analysis for obtaining g spectrum information of light emitted or absorbed by a sample and analyzing components and so on in the sample based on the spectrum information. The optical module includes a mirror unit, a beam splitter unit, a light incident unit, a first photodetector, a second light source, and a second photodetector. The mirror unit includes a movable mirror that moves in a predetermined direction and a fixed mirror the position of which is fixed. In such an optical module, an interference optical system on which measurement light and laser beam are incident is constituted by the beam splitter unit, the movable mirror, and the fixed mirror.

The measurement light incident from a first light source through a measurement target passes through the light incident unit and is split in the beam splitter unit. A part of the measurement light thus split is reflected by the movable mirror and then returns to the beam splitter unit. The rest of the measurement light thus split is reflected by the fixed mirror and then returns to the beam splitter unit. The part and the rest of the measurement light having returned to the beam splitter unit are detected by the first photodetector as interfering light.

Further, the laser beam emitted from the second light source is split by the beam splitter unit. A part of the laser beam thus split is reflected by the movable mirror and then returns to the beam splitter unit. The rest of the laser beam thus split is reflected by the fixed mirror and is then returns to the beam splitter unit. The part and the rest of the laser beam having returned to the beam splitter unit are detected by the second photodetector as the interfering light.

In such an optical module, a position of the movable mirror is measured based on a detection result of the interfering light of the laser beam. Further, based on a measurement result of the position of the movable mirror and the detection result of the interfering light of the measurement light, the spectroscopic analysis of the measurement target becomes possible. Specifically, a waveform called an interferogram is obtained by determining an intensity of the measurement light at each position of the movable mirror. By performing Fourier transform on the interferogram, spectrum information about the measurement target can be obtained. Therefore, the optical module described in WO 2019/009404 is used for a Fourier transform infrared spectroscopic analyzer (FTIR).

WO 2019/009404 is an example of the related art.

In the optical module described in WO 2019/009404, the movable mirror is driven by a drive unit functioning as an electrostatic actuator. A periodic electric signal input from the outside is applied to the drive unit, and the movable mirror is arranged to reciprocate in accordance with its resonance frequency.

Incidentally, in the Fourier transform spectroscopic analyzer, it is required to measure the position of the movable mirror with higher accuracy from a viewpoint of a requirement of an increase in analytical accuracy. Therefore, it is considered to measure the position of the movable mirror using optical heterodyne interferometry. In that case, since it is necessary to modulate the frequency of the laser beam using a light modulator, a signal source for generating an electric signal to be input to the light modulator becomes necessary. Then, an electric signal generation device for driving the movable mirror and an electric signal generation device for driving the light modulator are separately required, and a growth in size and an increase in power consumption of the interferometer using the optical module are concerned.

Therefore, there arises a problem of realizing the interferometer which is capable of accurately measuring the position of the movable mirror, and in which the reduction in size and the reduction in power consumption are achieved.

SUMMARY

An interferometer according to an application example of the present disclosure is
an interferometer including an analysis unit and a length measurement unit, wherein
the analysis unit includes
an analysis optical system that includes a moving mirror configured to reflect analysis light, and a first light receiving element configured to receive the analysis light and output a first received light signal, and that is configured to analyze a sample using irradiation of the sample with the analysis light and interference of the analysis light, and
a mirror drive unit configured to drive the moving mirror based on a mirror drive signal,
the length measurement unit includes
a length measurement optical system that includes a laser source configured to emit a laser beam, a light modulator configured to modulate a frequency of the laser beam using a vibrating element and add a modulation component, and a second light receiving element configured to receive the laser beam including a length measurement component generated by irradiating the moving mirror with the laser beam, and the modulation component, and output a second received light signal, and that is configured to detect a position of the moving mirror using interference of the laser beam, and
the vibrating element is a signal source of the mirror drive signal.

DESCRIPTION OF EMBODIMENTS

An interferometer according to the present disclosure will hereinafter be described in detail based on some embodiments shown in the accompanying drawings.

1. First Embodiment

First, the interferometer according to the first embodiment will be described.

Figure 1:
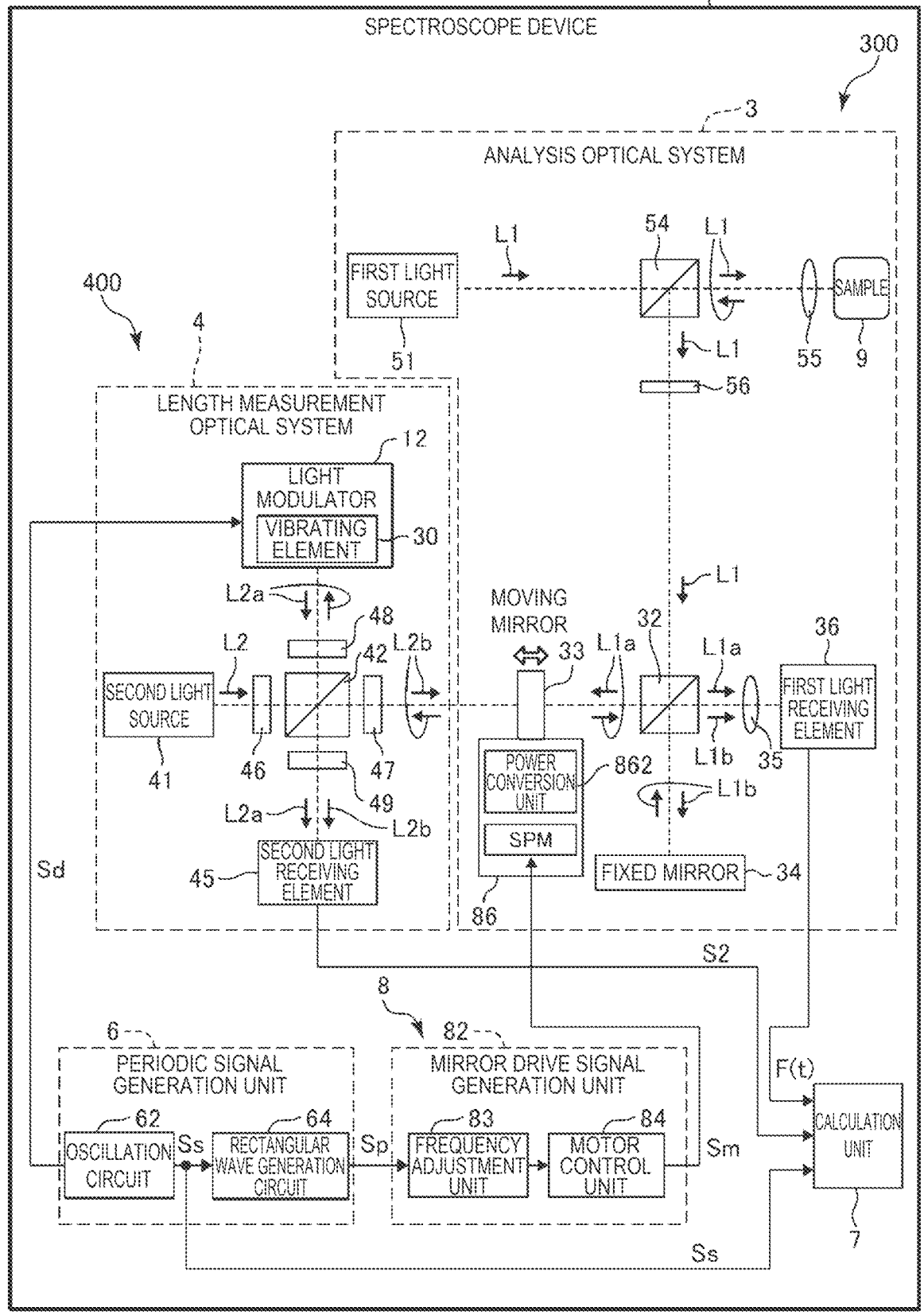
FIG. 1 is a schematic configuration diagram showing a spectroscopic device as an interferometer according to a first embodiment.
Figure 2:
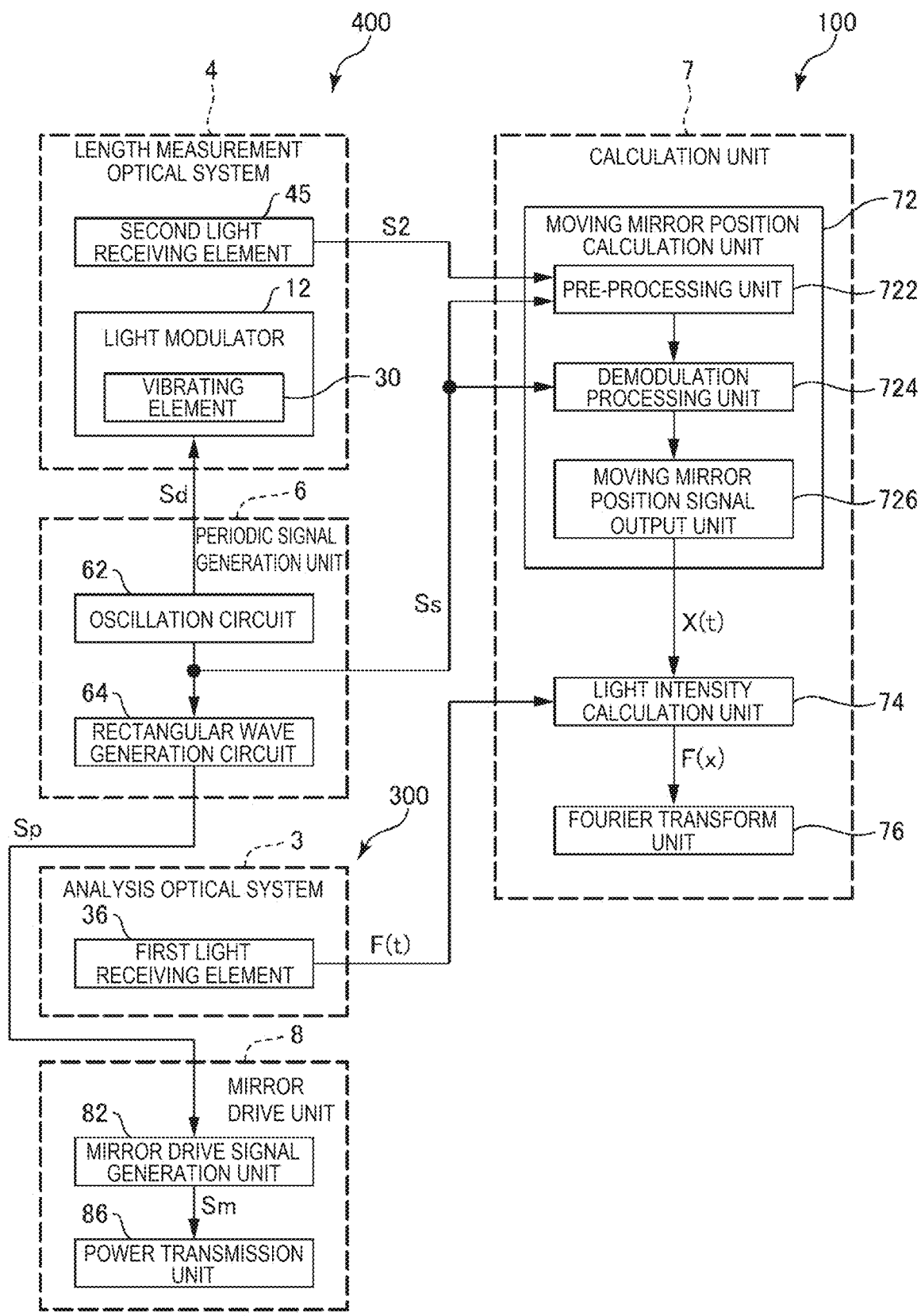
FIG. 2 is a schematic configuration diagram showing principal parts of an analysis unit, a length measurement unit, a periodic signal generation unit, and a calculation unit in FIG. 1.

FIG. 1 is a schematic configuration diagram showing a spectroscopic device 100 as the interferometer according to the first embodiment. FIG. 2 is a schematic configuration diagram showing principal parts of an analysis unit 300, a length measurement unit 400, a periodic signal generation unit 6, and a calculation unit 7 in FIG. 1.

1.1. Configuration of Spectroscopic Device

The spectroscopic device 100 shown in FIG. 1 irradiates a sample 9 as a device under test with analysis light L1 incident on the spectroscopic device 100, and makes the analysis light L1 radiated from the sample 9 pass through a Michelson interference optical system. Then, the spectroscopic device 100 detects a change in intensity of the interfering light obtained while moving the moving mirror to change a light path length inside the interference optical system, and then performs calculation on the detection result to thereby obtain the interferogram. By performing transform on the interferogram thus obtained, a spectral pattern including information derived from the sample 9 is obtained. By selecting a wavelength of the analysis light L1, the spectroscopic device 100 shown in FIG. 1 can be applied to, for example, Fourier transform infrared spectroscopic analysis (FT-IR), Fourier transform near-infrared spectroscopic analysis (FT-NIR), Fourier transform visible spectroscopic analysis (FT-VIS), Fourier transform ultraviolet spectroscopic analysis (FT-UV), and Fourier transform terahertz spectroscopic analysis (FT-THz) on the sample 9.

As shown in FIG. 2, the spectroscopic device 100 includes the analysis unit 300 having an analysis optical system 3 and a mirror drive unit 8, the length measurement unit 400 having a length measurement optical system 4, the periodic signal generation unit 6, and the calculation unit 7.

The analysis optical system 3 irradiates the sample 9 with the analysis light L1, and performs division and mixture of the analysis light L1 while changing an optical path length of the analysis light L1 so as to be able to extract a sample-derived component derived from the sample 9 from the analysis light L1, and thus, generates the interference. In the length measurement optical system 4, a change in the optical path length of the analysis light L1 is measured using length measurement light L2 which is a laser beam.

The periodic signal generation unit 6 outputs a reference signal Ss toward the calculation unit 7. The calculation unit 7 determines a waveform representing an intensity of the interfering light with respect to the optical path length, that is, the interferogram described above, based on a signal representing the intensity of the interfering light output from the analysis optical system 3 and a signal representing the change in the optical path length output from the length measurement optical system 4. Further, the calculation unit 7 performs the Fourier transform on the interferogram to obtain a spectral pattern.

1.1.1. Analysis Optical System

The analysis optical system 3 includes a first light source 51, a beam splitter 54, a condensing lens 55, and a neutral density filter 56. It should be noted that in the analysis optical system 3, some of these optical elements described above can be omitted, optical elements other than these can be provided, or these optical elements can be replaced by other optical elements.

The first light source 51 is a light source that emits, for example, white light, that is, light obtained by gathering light in a wide wavelength band, as the analysis light L1. The wavelength band of the analysis light L1, that is, a type of the first light source 51, is appropriately selected according to the purpose of spectroscopic analysis performed on the sample 9. When infrared spectroscopic analysis is performed, as the first light source 51, there can be cited, for example, a halogen lamp, an infrared lamp, and a tungsten lamp. When visible light spectroscopic analysis is performed, as the first light source 51, there can be cited, for example, a halogen lamp. When ultraviolet spectroscopic analysis is performed, examples of the first light source 51 include a deuterium lamp, and an ultraviolet light emitting diode (UV-LED).

By selecting a wavelength of 100 nm or more and less than 760 nm as the wavelength of the analysis light L1, it is possible to implement the spectroscopic device 100 capable of performing the ultraviolet spectroscopic analysis or the visible light spectroscopic analysis. In addition, by selecting a wavelength of 760 nm or more and 20 µm or less as the wavelength of the analysis light L1, it is possible to implement the spectroscopic device 100 capable of performing the infrared spectroscopic analysis or the near-infrared spectroscopic analysis. Further, by selecting a wavelength of 30 µm or more and 3 mm or less as the wavelength of the analysis light L1, it is possible to implement the spectroscopic device 100 capable of performing terahertz wave spectroscopic analysis.

The first light source 51 may not be provided to the spectroscopic device 100 and may be provided outside. In this case, the analysis light L1 emitted from the first light source 51 disposed outside may be introduced into the spectroscopic device 100. Meanwhile, by providing the first light source 51 to the spectroscopic device 100 as in the embodiment, alignment accuracy between the first light source 51 and the beam splitter 54 can be particularly enhanced, and loss of the analysis light L1 caused by alignment failure can be reduced to the minimum.

The first light source 51 may be a laser source that emits a laser beam. By using a laser source as the first light source 51, a spectroscopic device capable of realizing laser excitation spectroscopic analysis such as Fourier Raman spectroscopic analysis and Fourier fluorescence spectroscopic analysis for the sample 9 can be obtained. In this case, the configuration of the analysis optical system 3 may be changed from the above-described configuration. In this case, a known light source used for Raman spectroscopy or fluorescence spectroscopy is used as the laser source.

The analysis light L1 passes through the beam splitter 54, then is condensed by the condensing lens 55, and is emitted to the sample 9.

For example, a non-polarizing beam splitter is used as the beam splitter 54, but a polarizing beam splitter may also be used. In this case, a necessary wave plate may be appropriately added.

The condensing lens 55 condenses the analysis light L1 and reduces a spot size of the analysis light L1 with which the sample 9 is irradiated. Accordingly, local analysis is possible. When the local analysis is unnecessary, the condensing lens 55 may be omitted.

The analysis light L1 emitted from the sample 9 includes a sample-derived component generated by an action between the analysis light L1 and the sample 9. Examples of the sample-derived component include light absorption, reflection, scattering, and light emission of a specific wavelength by the sample 9 when the analysis light L1 acts on the sample 9. The analysis light L1 passes through the condensing lens 55, then is reflected by the beam splitter 54, and passes through the neutral density filter 56. The neutral density filter 56 selectively attenuates light of a predetermined wavelength. Accordingly, an S/N ratio (signal-to-noise ratio) of the sample-derived component can be increased, and the spectroscopic analysis can be performed with higher accuracy. Examples of the neutral density filter 56 include a notch filter having an optical density (OD value) of 6.0 or more.

The analysis optical system 3 includes a beam splitter 32, a moving mirror 33, a fixed mirror 34, a condensing lens 35, and a first light receiving element 36, which constitute a Michelson interference optical system. It should be noted that in the analysis optical system 3, some of these optical elements described above can be omitted, optical elements other than these can be provided, or these optical elements can be replaced by other optical elements.

The beam splitter 32 is a non-polarizing beam splitter that splits the analysis light L1 into two parts including light L1a and analysis light L1b. Specifically, the beam splitter 32 splits the analysis light L1 into two parts by reflecting a part of the analysis light L1 toward the moving mirror 33 as the analysis light L1a and transmitting the other part of the analysis light L1 toward the fixed mirror 34 as the analysis light L1b.

Examples of types of the beam splitter 32 include a plate-type element and a stacked-type element in addition to a prism-type element (cube-type element) shown in FIG. 1. Since wavelength dispersion occurs between the analysis light L1a and the analysis light L1b when the plate-type beam splitter 32 is used, a wavelength dispersion compensator may be disposed between the beam splitter 32 and the fixed mirror 34 when needed. The wavelength dispersion compensator is an optical element that compensates for wavelength dispersion caused by an optical path length difference between glass materials. In the embodiment, since a prism-type element is used as the beam splitter 32, the wavelength dispersion compensator is unnecessary. The prism-type element is an element in which an optical thin film is sandwiched between prisms. In addition, the stacked-type element is an element in which an optical thin film is sandwiched between two transparent flat plates. Similarly to the prism-type element, the stacked-type element can also eliminate the need for the wavelength dispersion compensator. In addition, in the prism-type element and the stacked-type element, long-term reliability of the beam splitter 32 can be enhanced since the optical thin film is not exposed.

In addition, the beam splitter 32 transmits the analysis light L1a reflected by the moving mirror 33 toward the first light receiving element 36, and reflects the analysis light L1b reflected by the fixed mirror 34 toward the first light receiving element 36. Therefore, the beam splitter 32 mixes the split analysis light L1a and L1b.

The moving mirror 33 is a mirror that moves in an incident direction of the analysis light L1a toward the beam splitter 32 and reflects the analysis light L1a. The moving mirror 33 is moved by the mirror drive unit 8 so as to reciprocate in the incident direction of the analysis light L1a described above. A phase of the analysis light L1a reflected by the moving mirror 33 changes according to a position of the moving mirror 33. Accordingly, the moving mirror 33 adds phase information derived from the moving mirror 33 to the analysis light L1a. The phase information derived from the moving mirror 33 is a change in phase added to the analysis light L1a in accordance with the position of the moving mirror 33.

The fixed mirror 34 is a mirror whose position is fixed relative to the beam splitter 32 and reflects the analysis light L1b. The analysis light L1b reflected by the fixed mirror 34 is mixed with the analysis light L1a by the beam splitter 32, and is received by the first light receiving element 36 as the interfering light. In the analysis optical system 3, an optical path difference occurs between an optical path of the analysis light L1a and an optical path of the analysis light L1b according to the position of the moving mirror 33.

The moving mirror 33 and the fixed mirror 34 may each be a flat mirror or a corner cube mirror. A metal coat using a metal such as Al, Au, or Ag, a dielectric multilayer film, or the like may be formed at a reflective surface of each mirror. Regarding the moving mirror 33, "moving in the incident direction of the analysis light" includes moving in a direction in which a component of the analysis light in the incident direction is contained. Therefore, the moving mirror 33 may move in a direction obliquely inclined with respect to the incident direction (non-parallel direction). In this case, the calculation unit 7 only needs to have a function of removing the influence of the moving mirror 33 obliquely inclined with respect to the incident direction of the analysis light. Further, the fixed mirror 34 may also move. In this case, the calculation unit 7 only needs to have a function of removing the influence of the movement of the fixed mirror 34.

The condensing lens 35 condenses the interfering light, that is, the mixed analysis light L1a and L1b, onto the first light receiving element 36. Depending on the area of the light receiving portion of the first light receiving element 36, the condensing lens 35 may be omitted.

The first light receiving element 36 receives the interfering light and obtains an intensity thereof. A signal indicating a temporal change in intensity is output as a first received light signal F(t). The first received light signal F(t) includes the sample-derived component generated by the interaction between the analysis light L1 and the sample 9, and the phase information derived from the moving mirror 33 described above.

Examples of the first light receiving element 36 include a photodiode, a phototransistor, and a photomultiplier tube (PMT). Among these, examples of the photodiode include an InGaAs-based photodiode, a Si-based photodiode, and an avalanche type photodiode.

1.1.2. Length Measurement Optical System

The length measurement optical system 4 is a Michelson interference optical system and includes a second light source 41, a beam splitter 42, a light modulator 12, a second light receiving element 45, a ½ wave plate 46, a ¼ wave plate 47, a ¼ wave plate 48, and an analyzer 49. In the length measurement optical system 4, some of these optical elements described above may be omitted, optical elements other than these may be provided, or these optical elements may be replaced by other optical elements. The length measurement optical system 4 outputs the phase information derived from the position of the moving mirror 33 and frequency information derived from the moving speed to the calculation unit 7 with the optical heterodyne interferometry. In the present specification, such information is referred to as a "length measurement component".

As the second light source 41, a light source that emits light narrow in spectral line width is preferably used. Examples of the second light source 41 include gas lasers such as a He—Ne laser and an Ar laser; semiconductor laser elements such as a distributed feedback-laser diode (DFB-LD), a fiber Bragg grating-laser diode (FBG-LD), a vertical cavity surface emitting laser (VCSEL) and a Fabry-Perot laser diode (FP-LD); and crystal lasers such as yttrium aluminum garnet (YAG).

The second light source 41 is particularly preferably a semiconductor laser element. Accordingly, it is possible to achieve a reduction in size, a reduction in weight, and a reduction in power consumption of the spectroscopic device 100.

The beam splitter 42 is a polarization beam splitter that transmits P-polarized light and reflects S-polarized light. The ½ wave plate 46 is disposed with an optical axis thereof rotated with respect to a polarization axis of the length measurement light L2. Accordingly, the length measurement light L2 passes through the ½ wave plate 46, becomes linearly polarized light including the P-polarized light and the S-polarized light, and is split into two parts including the P-polarized light and the S-polarized light by the beam splitter 42.

The length measurement light L2a, which is S-polarized light, is converted into circularly polarized light by the ¼ wave plate 48 and enters the light modulator 12. The light modulator 12 reflects the length measurement light L2a to thereby add a modulation component to the length measurement light L2a. The modulation component is a change in frequency caused by the length measurement light L2a being reflected by the vibrating element 30. The length measurement light L2a thus reflected returns to the beam splitter 42. At this time, the length measurement light L2a is converted into the P-polarized light by the ¼ wave plate 48.

Meanwhile, the length measurement light L2b, which is P-polarized light, is converted into circularly polarized light by the ¼ wave plate 47, and is incident on the moving mirror 33. The moving mirror 33 reflects the length measurement light L2b. Accordingly, a phase of the length measurement light L2b changes according to the position of the moving mirror 33. The length measurement light L2b reflected by the moving mirror 33 is returned to the beam splitter 42. At this time, the length measurement light L2b is converted into the S-polarized light by the ¼ wave plate 47.

The length measurement optical system 4 shown in FIG. 1 has a configuration in which the length measurement light L2b is incident on a surface different from a surface of the moving mirror 33 on which the analysis light L1a in the above-described analysis optical system 3 is incident, but the length measurement light L2b may be incident on a surface the same as the surface on which the analysis light L1a is incident.

The beam splitter 42 transmits the length measurement light L2a returned from the light modulator 12 toward the second light receiving element 45, and reflects the length measurement light L2b reflected by the moving mirror 33 toward the second light receiving element 45. Therefore, the beam splitter 42 mixes the split length measurement light L2a and L2b. The mixed length measurement light L2a and L2b is transmitted through the analyzer 49 and is incident on the second light receiving element 45.

A non-polarizing beam splitter may be used as the beam splitter 42 instead of the polarization beam splitter. In this case, since a wave plate or the like is unnecessary, the spectroscopic device 100 can be downsized by reducing the number of components.

As the light modulator 12, there can be cited a light modulator disclosed in, for example, JP-A-2022-38156. In the present embodiment, the light modulator 12 includes a vibrating element 30. The vibrating element 30 vibrates in response to an element drive signal Sd and reflects the length measurement light L2a. Accordingly, the light modulator 12 superimposes a modulation component on the length measurement light L2a.

Examples of the vibrating element 30 include a quartz crystal vibrator, a silicon vibrator, and a ceramic vibrator. These vibrators are vibrators that utilize a mechanical resonance phenomenon, and therefore have a high Q-value and can easily stabilize a natural frequency. Accordingly, the S/N ratio of the modulation component applied to the length measurement light L2a by the light modulator 12 can be increased, and accuracy of the reference signal Ss can be enhanced. Accordingly, the position of the moving mirror 33 can be determined with higher accuracy, and finally, the spectroscopic device 100 capable of generating a spectral pattern with high accuracy on the wavelength axis (wavenumber axis) can be implemented.

Examples of the quartz crystal vibrator include a quartz crystal AT vibrator, an SC-cut quartz crystal vibrator, a tuning fork-type quartz crystal vibrator, and a quartz crystal surface acoustic wave element. An oscillation frequency of the quartz crystal vibrator is, for example, about 1 kHz to several hundreds of MHz.

A silicon vibrator is a vibrator including a single-crystal silicon piece manufactured from a single-crystal silicon substrate using an MEMS technique and a piezoelectric membrane. MEMS (Micro-Electro Mechanical Systems) means a micro-electromechanical system. As a shape of the single-crystal silicon piece, there can be cited, for example, cantilever shapes such as a two-leg tuning fork shape and a three-leg tuning fork shape, and a fixed beam shape. An oscillation frequency of the silicon vibrator is, for example, about 1 kHz to several hundreds of MHz.

A ceramic vibrator is a vibrator including electrodes and a piezoelectric ceramic piece manufactured by sintering piezoelectric ceramics. As the piezoelectric ceramics, there can be cited, for example, lead zirconate titanate (PZT) and barium titanate (BTO). The oscillation frequency of the ceramic vibrator is, for example, about several hundreds of kHz to several tens of MHz.

Figure 3:
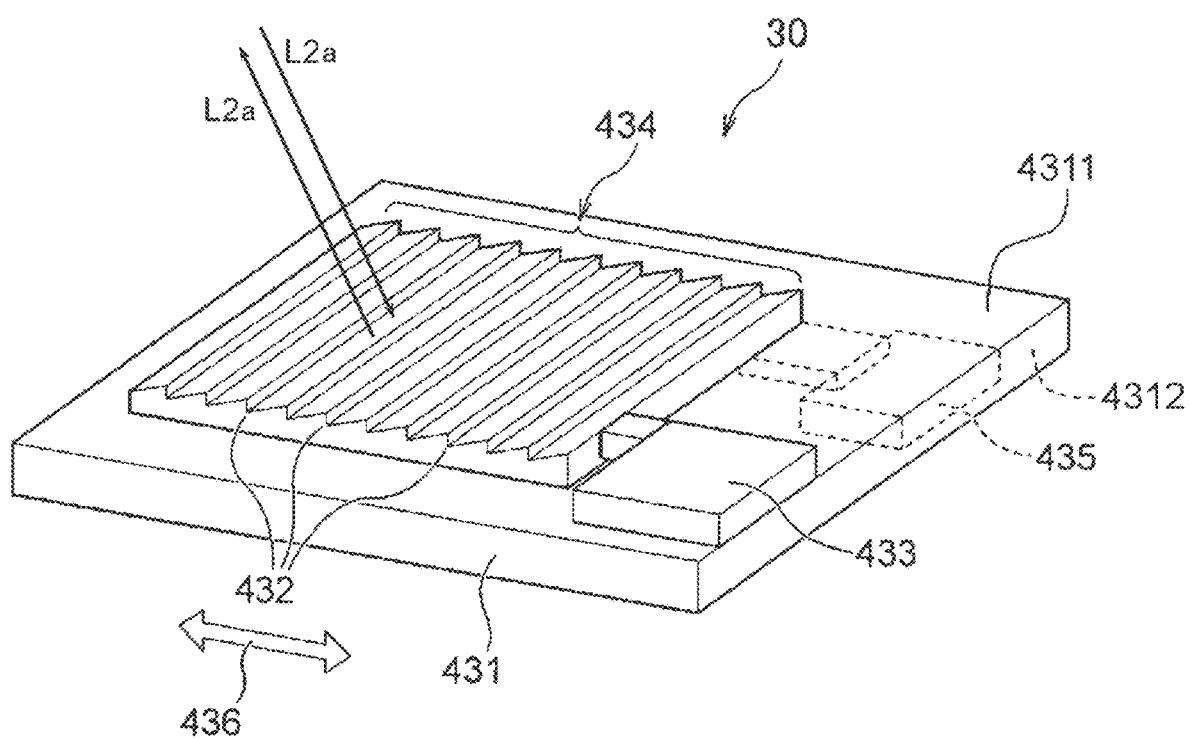
FIG. 3 is a perspective view showing a configuration example of a vibrating element shown in FIG. 1.

FIG. 3 is a perspective view showing a configuration example of the vibrating element 30 shown in FIG. 1.

The vibrating element 30 shown in FIG. 3 includes a vibrator element 431 shaped like a plate and a diffraction grating 434 provided to the vibrator element 431.

The vibrator element 431 is made of a material that repeats a mode in which the vibrator element 431 vibrates so as to be distorted in a direction along a surface when an electric potential is applied. The vibrator element 431 shown in FIG. 3 is a quartz crystal AT vibrator that makes a thickness shear vibration along a vibration direction 436 in a high-frequency range of a MHz band. Further, the diffraction grating 434 is disposed on a surface of the vibrator element 431. The diffraction grating 434 includes grooves 432 having a component crossing the vibration direction 436, that is, a plurality of grooves 432 each shaped like a straight line extending in a direction crossing the vibration direction 436.

The vibrator element 431 has an obverse surface 4311 and a reverse surface 4312 having an obverse-reverse relationship with each other. The diffraction grating 434 is disposed on the obverse surface 4311. In addition, the obverse surface 4311 is provided with a pad 433 for applying a potential to the vibrator element 431. Further, the reverse surface 4312 is also provided with a pad 435 for applying a potential to the vibrator element 431.

A size of the vibrator element 431 is, for example, about 0.50 mm or more and 10.0 mm or less in long side. Further, the thickness of the vibrator element 431 is, for example, about 0.10 mm or more and 2.0 mm or less. As an example, the shape of the vibrator element 431 is a square 1.6 mm on a side, and the thickness thereof is 0.35 mm.

The size of the diffraction grating 434 is, for example, about 0.20 mm or more and 3.0 mm or less in long side. Further, the thickness of the diffraction grating 434 is, for example, about 0.003 mm or more and 0.50 mm or less.

In the present embodiment, although the vibrator element 431 makes the thickness-shear vibration, the vibration is an in-plane vibration, as shown in FIG. 3 as the vibration direction 436, and therefore, even when light is made to perpendicularly enter the obverse surface of the vibrator element 431 as a simple body, the light modulation cannot be achieved. Therefore, in the vibrating element 30, the diffraction grating 434 is provided to the vibrator element 431 to thereby make the light modulation possible.

The diffraction grating 434 shown in FIG. 3 is, for example, a blazed diffraction grating. The blazed diffraction grating means a diffraction grating having a stepwise cross-sectional shape. It should be noted that the shape of the diffraction grating 434 is not limited thereto.

Figure 4:
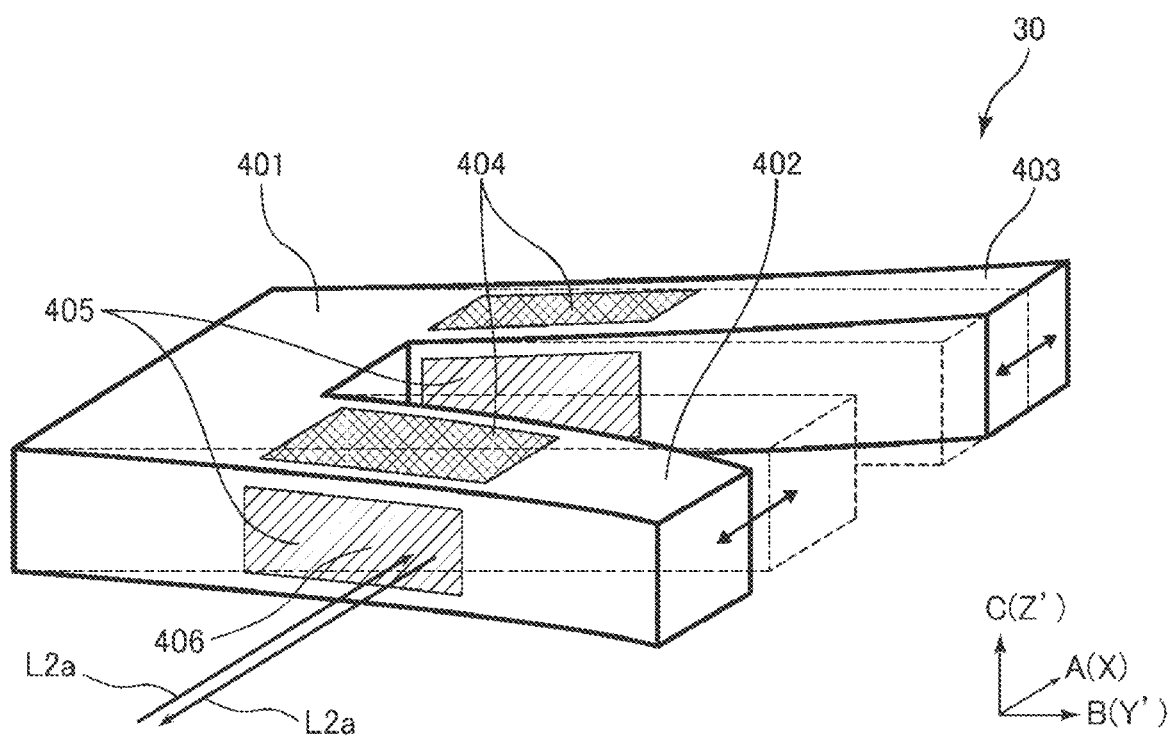
FIG. 4 is a perspective view showing another configuration example of the vibrating element shown in FIG. 1.

FIG. 4 is a perspective view showing another configuration example of the vibrating element 30 shown in FIG. 1. It should be noted that in FIG. 4, an A axis, a B axis, and a C axis are set as three axes perpendicular to each other, and are indicated by arrows. A tip side of the arrow is defined as a "positive side," and a base end side of the arrow is defined as a "negative side". Further, for example, both direction sides, the positive side and the negative side, of the A axis are referred to as an "A-axis direction". The same applies to a B-axis direction and a C-axis direction.

The vibrating element 30 shown in FIG. 4 is a tuning fork crystal vibrator. The vibrating element 30 shown in FIG. 4 includes a vibrating substrate having a base unit 401, a first vibrating arm 402, and a second vibrating arm 403. Such a tuning fork crystal vibrator is easily available and achieves stable oscillation since the manufacturing technique thereof has been established. Therefore, the tuning fork crystal vibrator is suitable as the vibrating element 30. Further, the vibrating element 30 includes electrodes 404, 405 and a light reflecting surface 406 provided to the vibrating substrate.

The base unit 401 is a region extending along the A axis. The first vibrating arm 402 is a region extending from an end portion at a negative side of the A axis of the base unit 401 toward the positive side of the B axis. The second vibrating arm 403 is a region extending from an end portion at the positive side of the A axis of the base unit 401 toward the positive side of the B axis.

The electrodes 404 are conductive films provided to side surfaces of the first vibrating arm 402 and the second vibrating arm 403 that are parallel to an A-B plane. Although not shown in FIG. 4, the electrodes 404 are provided respectively to the side surfaces opposed to each other, and drive the first vibrating arm 402 in response to voltages being applied thereto so as to be different in polarity from each other.

The electrodes 405 are conductive films provided to side surfaces of the first vibrating arm 402 and the second vibrating arm 403, the side surfaces crossing the A-B plane. It should be noted that although not shown in FIG. 4, the electrodes 405 are also provided respectively to the side surfaces opposed to each other, and drive the second vibrating arm 403 in response to voltages being applied thereto so as to be different in polarity from each other.

The light reflecting surfaces 406 are set on side surfaces crossing the A-B plane out of the first vibrating arm 402 and the second vibrating arm 403, and have a function of reflecting the length measurement light L2a. The side surface refers to a surface extending along the extending direction of the first vibrating arm 402 and the second vibrating arm 403. The light reflecting surface 406 shown in FIG. 4 is set in particular on the surface of the electrode 405 out of the side surfaces of the first vibrating arm 402. The electrode 405 provided to the first vibrating arm 402 also has a function as the light reflecting surface 406. It should be noted that it is possible to arrange to provide a light reflecting film not shown separately from the electrode 405.

In the tuning fork crystal vibrator, a quartz crystal piece carved out from a quartz crystal substrate is used. As the quartz crystal substrate used for manufacturing the tuning fork crystal vibrator, there is cited, for example, a quartz crystal Z-cut flat plate. In FIG. 4, an X axis parallel to the A axis, a Y' axis parallel to the B axis, and a Z' axis parallel to the C axis are set. The quartz crystal Z-cut flat plate is, for example, a substrate carved out from a quartz single crystal such that the X axis is an electrical axis, the Y' axis is a mechanical axis, and the Z' axis is an optical axis. Specifically, in an orthogonal coordinate system formed of the X axis, the Y' axis and the Z' axis, a substrate having a principal surface which is obtained by tilting an X-Y' plane defined by the X axis and the Y' axis by about 1° to 5° in a counterclockwise direction around the X axis is carved out from the quartz single crystal and is preferably used as the quartz crystal substrate. Further, by etching such a quartz crystal substrate, the quartz crystal piece to be used for the vibrating element 30 shown in FIG. 4 is obtained. The etching can be either of wet etching and dry etching.

Alternatively, the light reflecting surface 406 can be set on the surface of the electrode 404. In this case, it is sufficient to adjust the signals to be applied to the respective electrodes so that the tuning fork crystal vibrator makes an out-of-plane vibration, for example, so as to excite a mode (including spurious) that makes the out-of-plane vibration.

The second light receiving element 45 receives the mixed length measurement light L2a and L2b as the interfering light, and obtains an intensity thereof. A signal indicating a temporal change in intensity is output as a second received light signal S2. The second received light signal S2 includes a length measurement component derived from the moving mirror 33.

Examples of the second light receiving element 45 include a photodiode and a phototransistor.

Although the optical elements provided in each optical system are described above, it is preferable that an anti-reflection treatment is applied to an optical element that requires light to be incident thereon. Accordingly, S/N ratios of the first received light signal F(t) and the second received light signal S2 can be increased.

1.1.3. Periodic Signal Generation Unit

The periodic signal generation unit 6 shown in FIG. 2 generates a periodic signal and outputs the periodic signal as the reference signal Ss. In the present embodiment, as shown in FIG. 1, the periodic signal generation unit 6 includes an oscillation circuit 62 and a rectangular wave generation circuit 64.

As the oscillation circuit 62, there can be cited, for example, an oscillation circuit disclosed in JP-A-2022-38156. In the oscillation circuit 62, the vibrating element 30 operates as a signal source and generates a highly accurate periodic signal. Accordingly, the oscillation circuit 62 outputs the element drive signal Sd and the reference signal Ss high in accuracy. Therefore, the element drive signal Sd and the reference signal Ss are affected in the same way when being subjected to a disturbance. As a result, the modulation component added via the vibrating element 30 driven by the element drive signal Sd, and the reference signal Ss are also affected in the same way. Therefore, when the second received light signal S2 and the reference signal Ss are subjected to calculation in the calculation unit 7, the influence of disturbances contained in both signals can be canceled out or reduced in the process of the calculation. As a result, the calculation unit 7 can determine the position of the moving mirror 33 with higher accuracy even when subjected to the disturbance.

It should be noted that the oscillation circuit disclosed in the publication described above is a circuit using an inverter IC, but a Colpitts oscillation circuit can be used instead thereof.

The rectangular wave generation circuit 64 converts the reference signal Ss, which is an analog signal output from the oscillation circuit 62, into a pulse signal Sp, which is a digital signal. As the rectangular wave generation circuit 64, there can be cited, for example, an analog-to-digital conversion circuit using a comparator.

1.1.4. Mirror Drive Unit

Figure 5:
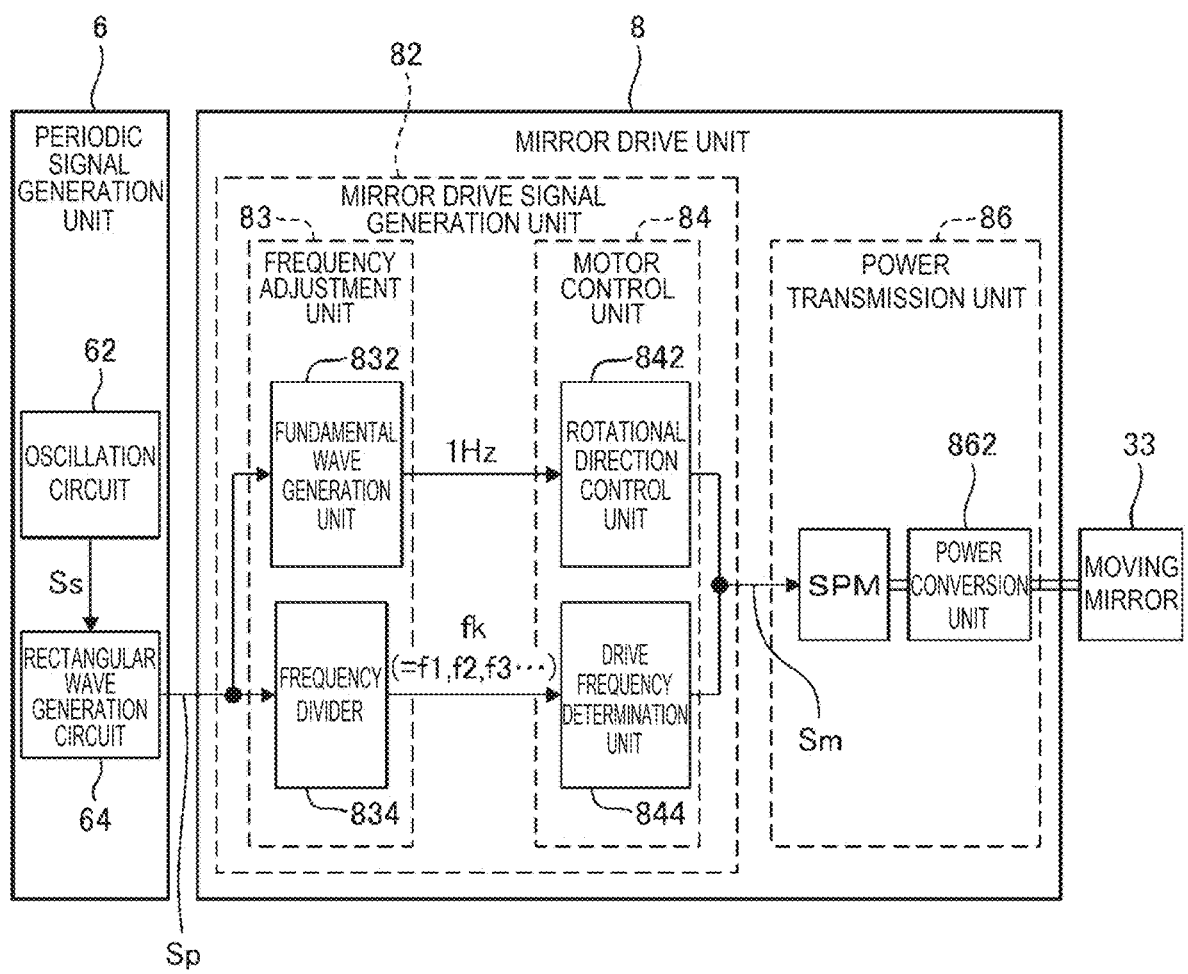
FIG. 5 is a functional block diagram showing functions of a mirror drive unit in FIG. 2.

FIG. 5 is a functional block diagram showing functions of the mirror drive unit 8 in FIG. 2.

The mirror drive unit 8 shown in FIG. 5 includes a mirror drive signal generation unit 82 and a power transmission unit 86. Among these, the mirror drive signal generation unit 82 includes a frequency adjustment unit 83 and a motor control unit 84. Further, the power transmission unit 86 includes a stepping motor SPM and a power conversion unit 862. The mirror drive signal generation unit 82 generates a mirror drive signal Sm with a drive frequency fk as a target based on the pulse signal Sp input from the periodic signal generation unit 6. Then, the motor control unit 84 outputs the mirror drive signal Sm toward the stepping motor SPM, and drives the moving mirror 33 via the power conversion unit 862.

The frequency adjustment unit 83 includes a fundamental wave generation unit 832 and a frequency divider 834.

The pulse signal Sp is input from the periodic signal generation unit 6 to the fundamental wave generation unit 832. The fundamental wave generation unit 832 generates a fundamental wave signal having a frequency of 1 Hz which can be used as, for example, a timing signal based on the pulse signal Sp. In this case, it is sufficient for the fundamental wave generation unit 832 to have a function of using, for example, the pulse signal Sp having a frequency of 32.768 kHz and dividing the frequency by 15. It should be noted that the frequency of the fundamental wave signal is not limited to 1 Hz.

The pulse signal Sp is also input to the frequency divider 834 from the periodic signal generation unit 6. The frequency divider 834 divides the frequency of the pulse signal Sp into n to reduce the frequency. As the frequency divider 834, for example, a digital frequency divider constituted by flip-flops of a plurality of stages is used. According to such a configuration, since it becomes possible to select a plurality of types of frequencies, it is possible for the motor control unit 84 described later to select an appropriate frequency in accordance with the moving speed required for driving of the moving mirror 33. Here, the frequency selected by the motor control unit 84 is defined as the drive frequency fk. The drive frequency fk is a variable taking values different from each other corresponding to the frequency division number such as f1, f2, f3, . . . in accordance with a requirement from the motor control unit 84.

Such a frequency adjustment unit 83 as described above is capable of generating a fundamental wave signal that can be used as the timing signal or the like, and generating a pulse signal with the desired drive frequency fk. Since the fundamental wave signal is suitable for an application such as timing control, the fundamental wave signal can be used for various purposes such as control of switching the moving direction of the moving mirror 33 and control of analysis time. Accordingly, the frequency adjustment unit 83 can generate the fundamental wave signal without preparing a new signal source. Further, the frequency adjustment unit 83 can output a pulse signal with the desired drive frequency fk. Therefore, the mirror drive unit 8 can adjust the moving speed of the moving mirror 33 as appropriate. Accordingly, it is possible to realize the mirror drive unit 8 having a wide selection range of the moving speed of the moving mirror 33.

The motor control unit 84 includes a rotational direction control unit 842 and a drive frequency determination unit 844.

The fundamental wave signal having a frequency of, for example, 1 Hz is input to the rotational direction control unit 842. The rotational direction control unit 842 measures an elapsed time during which the stepping motor SPM rotates in the same direction based on the fundamental wave signal. When a target time has elapsed, a control signal for reversing the rotational direction is output. Thus, the rotational direction of the stepping motor SPM can be switched at predetermined time intervals. As a result, reciprocation of the moving mirror 33 becomes possible.

The pulse signal with the drive frequency fk is input to the drive frequency determination unit 844. The drive frequency determination unit 844 determines the drive frequency fk in accordance with the moving speed required for the moving mirror 33. For example, when the driving method of the stepping motor SPM is a pulse frequency modulation method (PFM method) and the power conversion unit 862 has a mechanism that converts a rotational motion into a linear motion such as a ball screw, the moving speed of the moving mirror 33 is, for example, proportional to the drive frequency fk. Accordingly, it is sufficient for the drive frequency determination unit 844 to have a function of determining the drive frequency fk based on, for example, such a proportional relationship. As a specific example of such a drive frequency determination unit 844, there can be cited a multi-phase generation driver.

Such a motor control unit 84 as described above outputs the mirror drive signal Sm in a format corresponding to the drive method of the stepping motor SPM based on the rotation method determined by the rotational direction control unit 842, and the drive frequency fk determined by the drive frequency determination unit 844.

The stepping motor SPM rotates in a predetermined rotational direction and at a predetermined rotation speed in accordance with the mirror drive signal Sm. The rotation output is transmitted to the power conversion unit 862.

The power conversion unit 862 includes, for example, a conversion mechanism having a ball screw, or a conversion mechanism having a rack gear and a pinion gear. These conversion mechanisms can easily increase the movement amount compared to when moving the moving mirror 33 using, for example, a MEMS (Micro-Electro Mechanical Systems) mechanism. Therefore, it is possible to easily increase the wavelength resolution (wavenumber resolution) of the spectral pattern that can be obtained. Among them, the conversion mechanism having the ball screw is preferably used. The ball screw is high in positional accuracy, and is capable of moving the moving mirror 33 with high accuracy.

As described hereinabove, the present embodiment is configured to generate the mirror drive signal Sm based on the reference signal Ss output from the periodic signal generation unit 6. That is, in the present embodiment, the vibrating element 30 provided to the light modulator 12 has not only a function as a frequency shifter that adds a modulation component to the length measurement light L2a and a function as a signal source of the reference signal Ss, but also a function as a signal source of the mirror drive signal Sm. The signal source means the fact that a periodic signal obtained by oscillating the vibrating element 30 using the oscillation circuit 62 is used for the generation of the reference signal Ss and the mirror drive signal Sm.

According to such a configuration, the vibrating element 30 can also be used for the generation of the mirror drive signal Sm. Therefore, there is no need to prepare a signal source other than the signal source of the reference signal Ss, and the reduction in size, the reduction in weight, and the reduction in power consumption of the spectroscopic device 100 can be achieved. In addition, since the number of the signal sources is reduced compared to the related art, it is possible to achieve the reduction in cost of the spectroscopic device 100.

Further, since the accurate rotational angle control of the stepping motor SPM can be achieved based on the number of pulses of the mirror drive signal Sm, the mirror drive unit 8 described above is capable of accurately controlling the movement amount and the moving speed of the moving mirror 33.

1.1.5. Calculation Unit

The calculation unit 7 shown in FIG. 2 includes a moving mirror position calculation unit 72, a light intensity calculation unit 74, and a Fourier transform unit 76. Functions realized by these functional units are implemented by hardware including, for example, a processor, a memory, an external interface, an input unit, and a display unit. Specifically, the functions are implemented by the processor reading and executing a program stored in the memory. It should be noted that these constituents are made capable of communicating with each other via an external bus.

As the processor, there can be cited, for example, a central processing unit (CPU) and a digital signal processor (DSP). It should be noted that it is possible to arrange to adopt a system in which a field-programmable gate array (FPGA), an application-specific integrated circuit (ASIC), or the like realizes the functions described above instead of the system in which these processors execute software.

As the memory, there can be cited, for example, a hard disk drive (HDD), a solid state drive (SSD), an electrically erasable programmable read-only memory (EEPROM), a read-only memory (ROM), and a random access memory (RAM).

Examples of the external interface include a digital input and output port such as a universal serial bus (USB) and an Ethernet (registered trademark) port.

As the input unit, there can be cited various input devices such as a keyboard, a mouse, a touch panel, and a touch pad. Examples of the display unit include a liquid crystal display panel and an organic electro luminescence (EL) display panel. The input unit and the display unit may be provided as necessary, and may be omitted.

1.1.5.1. Moving Mirror Position Calculation Unit

The moving mirror position calculation unit 72 shown in FIG. 2 identifies the position of the moving mirror 33 based on an optical heterodyne interferometry, and generates the moving mirror position signal X(t) based on a result thereof. Specifically, since the length measurement optical system 4 includes the light modulator 12, a modulation component can be added to the length measurement light L2a. Then, when the length measurement light L2a and L2b interfere with each other, the length measurement component derived from the moving mirror 33 can be acquired with high accuracy from the interfering light thus obtained. Further, the moving mirror position signal X(t) can be obtained with high accuracy from the length measurement component in the calculation unit 7. According to the optical heterodyne interferometry, extraction of the length measurement component is less susceptible to the influence of disturbances, in particular, the influence of stray light having a frequency that becomes noise, and has high robustness.

The moving mirror position calculation unit 72 shown in FIG. 2 includes a pre-processing unit 722, a demodulation processing unit 724, and a moving mirror position signal output unit 726. The pre-processing unit 722 and the demodulation processing unit 724 may be, for example, a pre-processing unit and a demodulation unit disclosed in JP-A-2022-38156.

The pre-processing unit 722 performs preprocessing on the second received light signal S2 based on the reference signal Ss. The demodulation processing unit 724 demodulates the length measurement component derived from the moving mirror 33 from the pre-processed signal output from the pre-processing unit 722 based on the reference signal Ss. That is, the demodulation processing unit 724 demodulates the length measurement component based on the reference signal Ss which is the periodic signal generated by the periodic signal generation unit 6, and the second received light signal S2.

The moving mirror position signal output unit 726 generates the moving mirror position signal X(t) based on the length measurement component derived from the moving mirror 33 demodulated by the demodulation processing unit 724, and then outputs the moving mirror position signal X(t). The moving mirror position signal X(t) obtained by this method is a signal representing the position of the moving mirror 33 that changes with time, and captures the displacement of the moving mirror 33 at intervals sufficiently shorter than the wavelength of the length measurement light L2. For example, when the wavelength of the length measurement light L2 is several hundreds of nanometers, a positional resolution of the moving mirror position signal X(t) shorter than 10 nm becomes achievable. Therefore, the light intensity calculation unit 74 can generate accurate digital data of the interferogram F(x).

Figure 6:
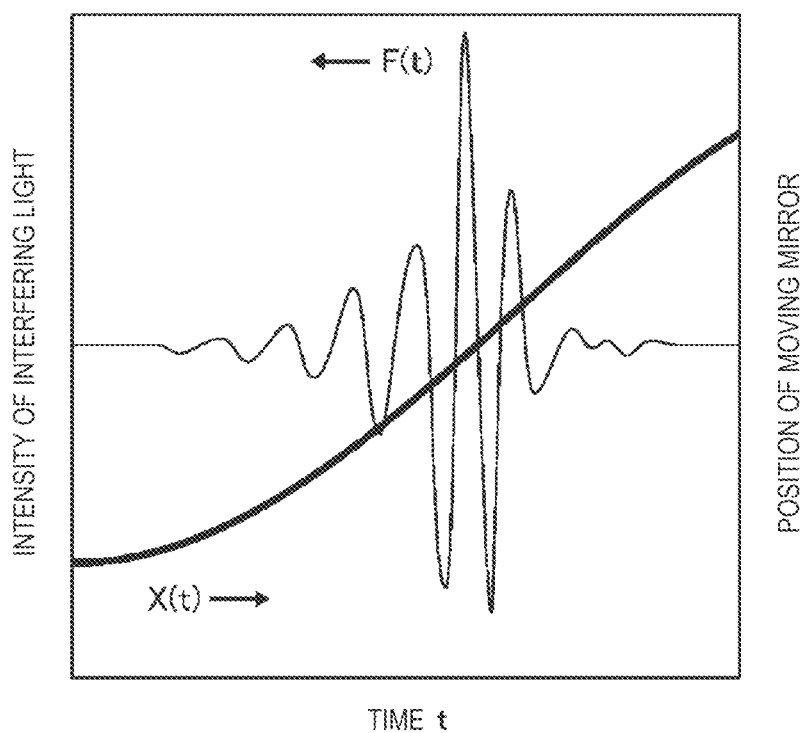
FIG. 6 is a diagram showing an example of a first received light signal and a moving mirror position signal obtained by the spectroscopic device shown in FIG. 1.

FIG. 6 is a diagram showing an example of the first received light signal F(t) and the moving mirror position signal X(t) obtained by the spectroscopic device 100 shown in FIG. 1. A horizontal axis in FIG. 6 represents time t, and a vertical axis represents the intensity of the interfering light incident on the first light receiving element 36 or the position of the moving mirror 33.

The moving mirror position signal X(t) shown in FIG. 6 is a signal that continuously detects a change in the position of the moving mirror 33 and realizes the high positional resolution. Therefore, by generating the interferogram F(x) based on the moving mirror position signal X(t), the interferogram F(x) having a larger number of data points is obtained. The large number of data points means a short sampling interval of the interferogram F(x), and high accuracy thereof. Therefore, by using the interferogram F(x) thus obtained, the spectral pattern having a high wavelength resolution (wavenumber resolution) can finally be obtained.

In addition, since the sampling interval can be shortened, the interferogram F(x) having a sufficient number of data points can be obtained even when the analysis light L1 having a shorter wavelength (having a larger wavenumber) is used. Accordingly, it is possible to obtain a spectral pattern in a wider wavelength range (wider wavenumber range), that is, a spectral pattern in a wider band.

1.1.5.2. Light Intensity Calculation Unit

The light intensity calculation unit 74 generates, based on the first received light signal F(t) and the moving mirror position signal X(t), a waveform (the interferogram F(x)) representing the intensity of the interfering light with respect to the position of the moving mirror 33.

As described above, the first received light signal F(t) includes the sample-derived component and the phase information derived from the moving mirror 33. The light intensity calculation unit 74 extracts an intensity of the first received light signal F(t) based on the moving mirror position signal X(t). Then, the light intensity calculation unit 74 generates the interferogram F(x) based on the position of the moving mirror 33 which is determined based on the moving mirror position signal X(t), and the intensity of the first received light signal F(t). The interferogram F(x) is represented by a function of an optical path difference between reflected light by the moving mirror 33 and reflected light by the fixed mirror 34 in the analysis optical system 3 and the intensity of the interfering light received by the first light receiving element 36 (intensity of the first received light signal F(t)).

Figure 7:
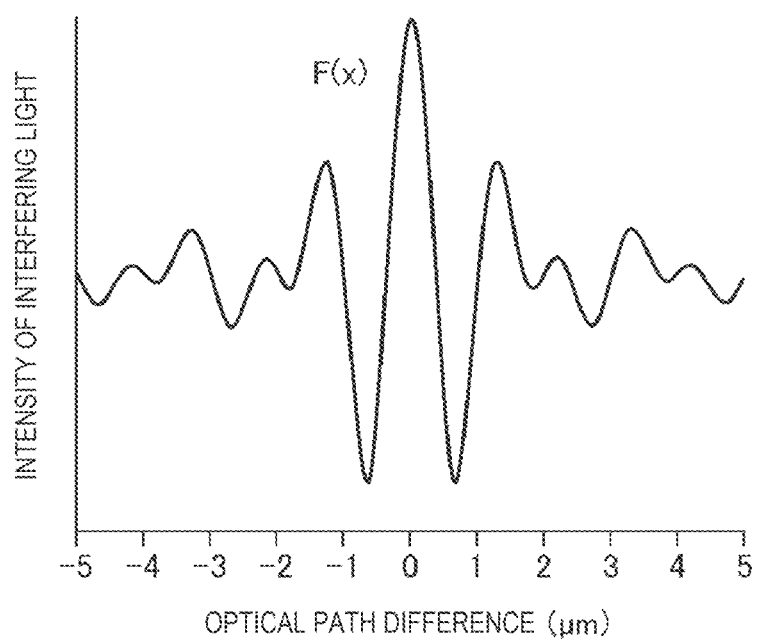
FIG. 7 is a diagram showing an example of an interferogram.

FIG. 7 is a diagram showing an example of the interferogram F(x). A horizontal axis of FIG. 7 represents the optical path difference in the analysis optical system 3, and a vertical axis represents the intensity of the interfering light. The optical path difference in the analysis optical system 3 is a difference between an optical path length between the beam splitter 32 and the moving mirror 33 and an optical path length between the beam splitter 32 and the fixed mirror 34. In FIG. 7, a zero optical path difference is taken as an origin of the horizontal axis.

1.1.5.3. Fourier Transform Unit

The Fourier transform unit 76 performs the Fourier transform on the interferogram F(x). Thus, a spectral pattern including information unique to the sample 9 is obtained.

Figure 8:
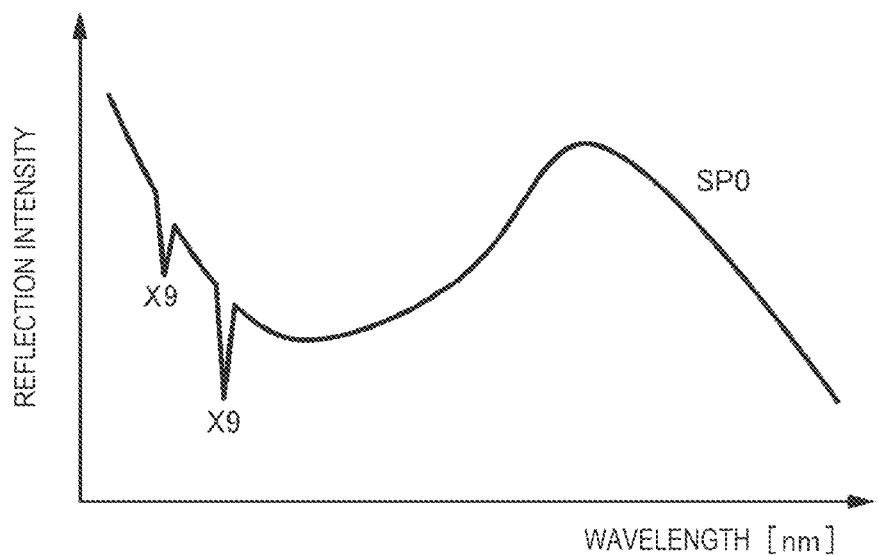
FIG. 8 is a diagram showing an example of a spectral pattern obtained by performing a spectroscopic analysis on a sample.

FIG. 8 is an example of the spectral pattern SP0 obtained by performing spectroscopic analysis on the sample 9. The spectral pattern SP0 is an example of a reflection spectrum of the sample 9.

In the spectral pattern SP0 shown in FIG. 8, the sample-derived component generated by the analysis light L1 acting on the sample 9 is reflected as an absorption peak X9. According to the spectroscopic device 100, characteristics of the sample 9, for example, a material, a structure, and a component, can be analyzed based on the spectral pattern SP0.

The spectral pattern SP0 is generated by performing the Fourier transform on the interferogram F(x). Since the interferogram F(x) is an electric field amplitude waveform obtained by using the position of the moving mirror 33 as a parameter, the spectral pattern SP0 obtained by performing the Fourier transform on the electric field amplitude waveform has wavelength information. The position of the moving mirror 33 is directly linked to the wavenumber accuracy of the spectral pattern SP0. Therefore, according to the spectroscopic device 100 of the embodiment, the spectral pattern SP0 with high accuracy on the wavelength axis (wavenumber axis) can be generated.

1.2. Operation Conditions of Mirror Drive Unit

In the calculation unit 7 described above, there is a frequency band which is determined based on the modulation frequency fm of the light modulator 12, and in which arithmetic processing can be performed. Specifically, prior to demodulation processing, the pre-processing unit 722 divides the received light signal into a signal PASS1 in a band (fm band) corresponding to the same frequency as the modulation frequency fm and a signal PASS2 in a band (2fm band) corresponding to a frequency twice as high as the modulation frequency fm to perform the preprocessing. These two signals PASS1 and PASS2 need to be separated from each other without overlapping each other.

Figure 9:
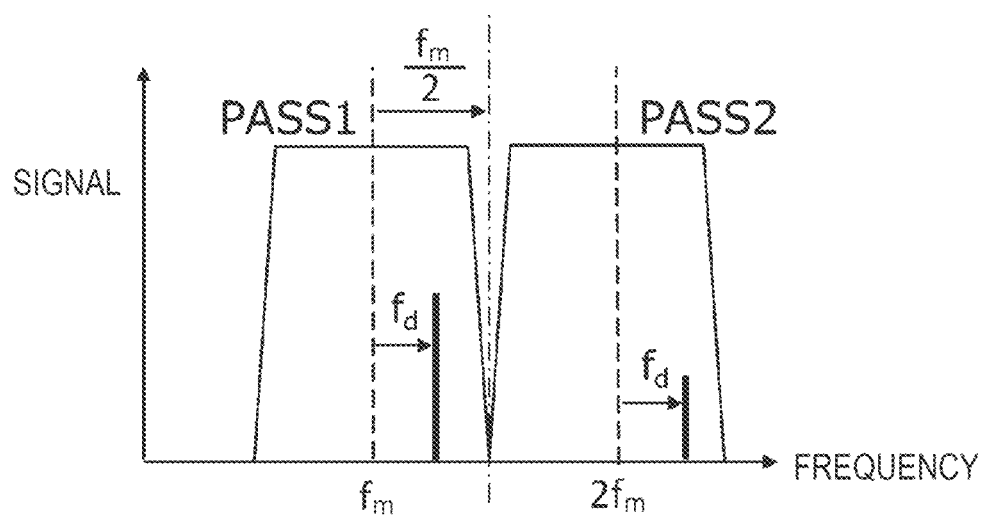
FIG. 9 is a diagram schematically showing bands of signals to be subjected to arithmetic processing in a pre-processing unit.

FIG. 9 is a diagram schematically showing the respective bands of the signals PASS1, PASS2 to be subjected to the arithmetic processing in the pre-processing unit 722.

The signals PASS1, PASS2 shown in FIG. 9 are separated so that the bands thereof do not overlap each other. Specifically, a maximum value of the band of the signal PASS1 is limited to a range of fm/2 at the high frequency side from fm.

The interfering light including the modulation component modulated with the modulation frequency fm and the length measurement component derived from the moving mirror 33 enters the second light receiving element 45 of the length measurement optical system 4 described above. Therefore, as shown in FIG. 9, the second received light signal S2 output from the second light receiving element 45 includes a frequency shift of the Doppler frequency fd according to the moving speed of the moving mirror 33. By measuring the Doppler frequency fd, the moving speed of the moving mirror 33, and further, the position of the moving mirror 33 can be calculated.

In order to measure the Doppler frequency fd, the Doppler frequency fd needs to be included in each of the fm band and the 2fm band. It is preferable to set the operating conditions of the mirror drive unit 8 so as to satisfy the constraint condition. The operating conditions will hereinafter be described.

First, as shown in FIG. 9, it is preferable for the Doppler frequency fd to satisfy the following formula (1).

$$fd < fm/2 \quad (1)$$

Since the Doppler frequency fd can be expressed by the moving speed v of the moving mirror 33 and the wavelength λ of the length measurement light L2a, the following formula (2) is derived from the above formula (1).

$$(2/\lambda)v < fm/2 \quad (2)$$

When the above formula (2) is transformed, the following formula (3) is derived.

$$v < (fm/4)\lambda \quad (3)$$

From the above formula (3), the moving speed of the moving mirror 33 is preferably within a predetermined range based on the modulation frequency fm and the wavelength λ.

From this constraint condition, the operating conditions of the mirror drive unit 8 are obtained.

In the mirror drive unit 8 having the configuration shown in FIG. 5, the drive frequency determination unit 844 determines the drive frequency fk. The drive frequency fk is proportional to, for example, the moving speed v of the moving mirror 33. Specifically, the following formula (4) holds between the drive frequency fk and the moving speed v.

$$v = h \cdot fk \quad (4)$$

It should be noted that h in the formula (4) described above is a coefficient representing a motor performance. The coefficient h representing the motor performance is calculated as follows, for example.

When the power conversion unit 862 includes the ball screw, the screw pitch of the ball screw is denoted by P [mm]. Further, an angle of rotation by one pulse of the mirror drive signal Sm input to the stepping motor SPM is denoted by s [deg/pulse]. At this time, the coefficient h can be considered as a moving distance of the moving mirror 33 corresponding to one pulse, and is expressed by the following formula (5).

$$H = P \cdot s/360 \quad (5)$$

Then, the following formula (6) is derived from the above formulas (4) and (5).

$$V = \{(P \cdot s)/360\} fk = g(fk, h) \quad (6)$$

As described above, the moving speed v of the moving mirror 33 can be expressed by a function g of the drive frequency fk and the coefficient h representing the motor performance. Then, the following formulas (7), (8) representing the operating conditions of the mirror drive unit 8 are derived from the formula (3) and the formula (6) described above.

$$\{(P \cdot s)/360\} fk < (fm/4)\lambda \quad (7)$$

$$fk < \{90/(P \cdot s)\}\lambda \cdot fm \quad (8)$$

As described above, when the mirror drive unit 8 is in operation, it is sufficient to select the drive frequency fk so as to satisfy the formula (8) described above. Thus, it is possible to move the moving mirror 33 at the moving speed v at which the position of the moving mirror 33 can be measured. Therefore, it is possible to realize the spectroscopic device 100 capable of measuring the position of the moving mirror 33 with good reproducibility while achieving the reduction in size, the reduction in weight, and the reduction in power consumption.

It should be noted that in the present embodiment, the modulation frequency fm of the light modulator 12 is determined in accordance with the natural frequency of the vibrating element 30. Therefore, by using the vibrating element 30 having a high natural frequency, the modulation frequency fm rises, and accordingly, the fm band and the 2fm band described above can also be widened. For example, the vibrating element 30 has a high natural frequency in the MHz band like the quartz crystal AT vibrator described above. Accordingly, since it is possible to increase the measurable moving speed v of the moving mirror 33, it becomes possible to move the moving mirror 33 at higher speed. As a result, it is possible to obtain the spectroscopic device 100 capable of shortening the measurement time, that is, performing a high-speed analysis.

It should be noted that as described above, the fact that the moving speed v of the moving mirror 33 can be expressed by the function g (fk, h) also applies to motors other than the stepping motor SPM, such as a motor of a PWM (pulse width modulation) type, a piezoelectric motor, and a linear motor. Accordingly, instead of the stepping motor SPM, such motors can be used in the mirror drive unit 8.

2. Second Embodiment

Next, a spectroscopic device according to a second embodiment will be described.

Figure 10:
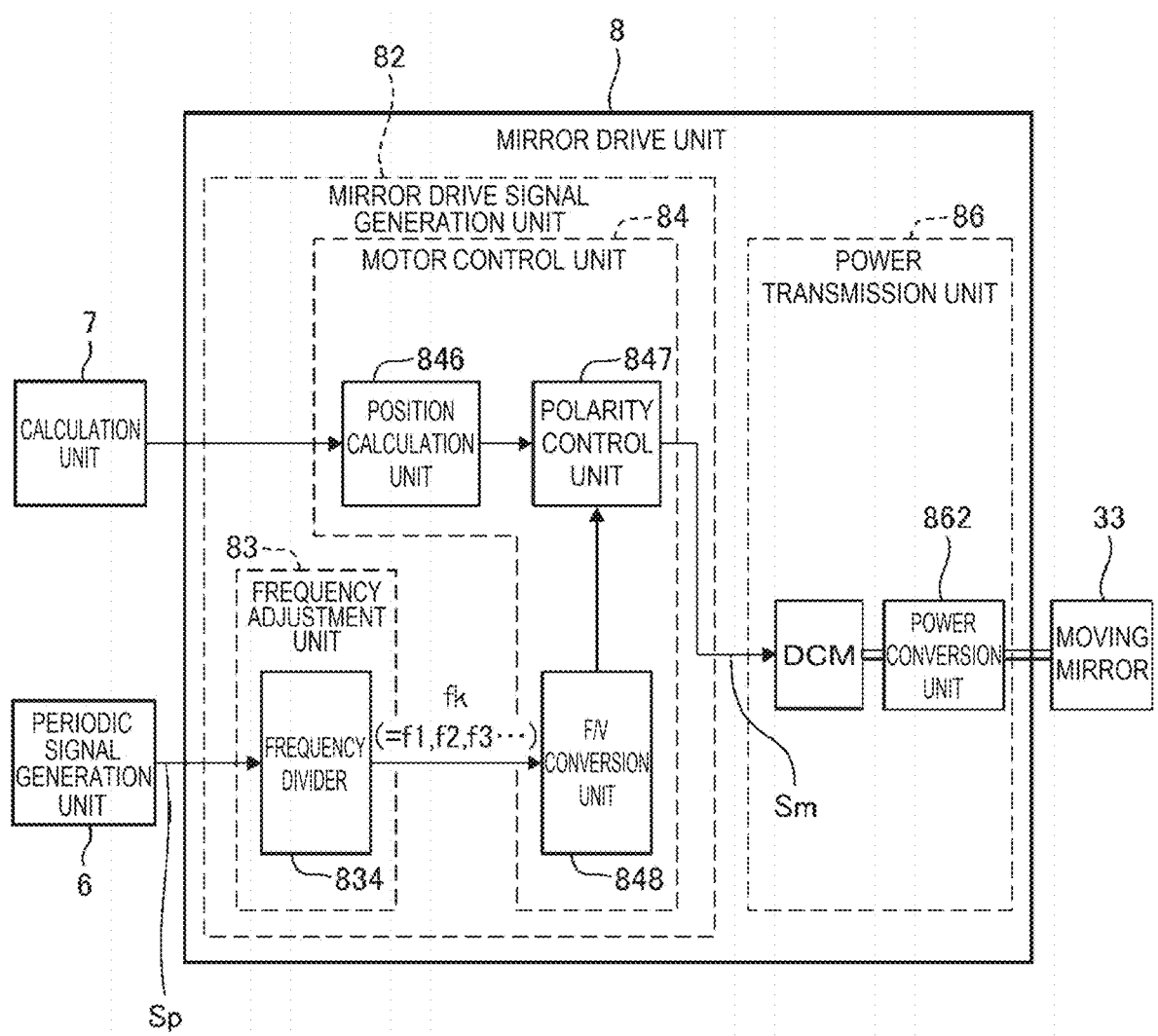
FIG. 10 is a functional block diagram showing functions of a mirror drive unit provided to a spectroscopic device as an interferometer according to a second embodiment.

FIG. 10 is a functional block diagram showing functions of the mirror drive unit 8 provided to the spectroscopic device 100 as an interferometer according to the second embodiment.

The second embodiment will hereinafter be described. In the following description, differences from the first embodiment will mainly be described, and the description of substantially the same matters will be omitted. It should be noted that in FIG. 10, the same reference symbols are given to matters substantially the same as those in the first embodiment.

The second embodiment is substantially the same as the first embodiment except that the configuration of the mirror drive unit 8 shown in FIG. 10 is different from FIG. 5.

The mirror drive signal generation unit 82 shown in FIG. 10 includes the frequency adjustment unit 83 and the motor control unit 84. Further, the power transmission unit 86 shown in FIG. 10 includes a DC motor DCM and the power conversion unit 862. The mirror drive signal generation unit 82 shown in FIG. 10 generates the mirror drive signal Sm of a DC voltage V as a target based on the pulse signal Sp input from the periodic signal generation unit 6. Then, the motor control unit 84 outputs the mirror drive signal Sm toward the DC motor DCM to drive the moving mirror 33 via the power conversion unit 862.

Similarly to the first embodiment, the frequency adjustment unit 83 shown in FIG. 10 has the frequency divider 834 to which the pulse signal Sp from the periodic signal generation unit 6 is input.

The motor control unit 84 shown in FIG. 10 includes a position calculation unit 846, a polarity control unit 847, and an F/V conversion unit 848.

The moving mirror position signal X(t) output from the calculation unit 7 is input to the position calculation unit 846. The position calculation unit 846 calculates the position of the moving mirror 33 based on the moving mirror position signal X(t). It should be noted that it is possible to arrange that other information from which the position of the moving mirror 33 can be calculated is input to the position calculation unit 846.

The polarity control unit 847 outputs the mirror drive signal Sm to be input to the DC motor DCM. In the DC motor, the rotation speed changes according to the voltage of the mirror drive signal Sm, and in general, the voltage and the rotation speed are proportional to each other. Further, the polarity control unit 847 switches the polarity of the mirror drive signal Sm in accordance with reciprocating time of the moving mirror 33. Accordingly, the reciprocation of the moving mirror 33 becomes possible.

The F/V conversion unit 848 determines the drive frequency fk in accordance with the moving speed required for the moving mirror 33. Further, the F/V conversion unit 848 converts the drive frequency fk output from the frequency divider 834 into the DC voltage V. The F/V conversion unit 848 performs a frequency-voltage conversion based on, for example, a proportional relationship between the drive frequency fk and the DC voltage V to be output.

Accordingly, in the mirror drive unit 8 shown in FIG. 10, the moving speed of the moving mirror 33 can be expressed by a function g (V,h). In this case, V is the output voltage of the F/V conversion unit 848. It should be noted that the DC motor DCM can be replaced by a motor of substantially the same drive system such as a linear motor.

In the second embodiment described above, effects the same as those of the first embodiment can also be obtained.

Further, since the rotation speed of the DC motor DCM can easily be controlled based on the DC voltage of the mirror drive signal Sm, the moving speed of the moving mirror 33 can easily be controlled according to the mirror drive unit 8.

3. Third Embodiment

Next, an interferometer according to a third embodiment will be described.

Figure 11:
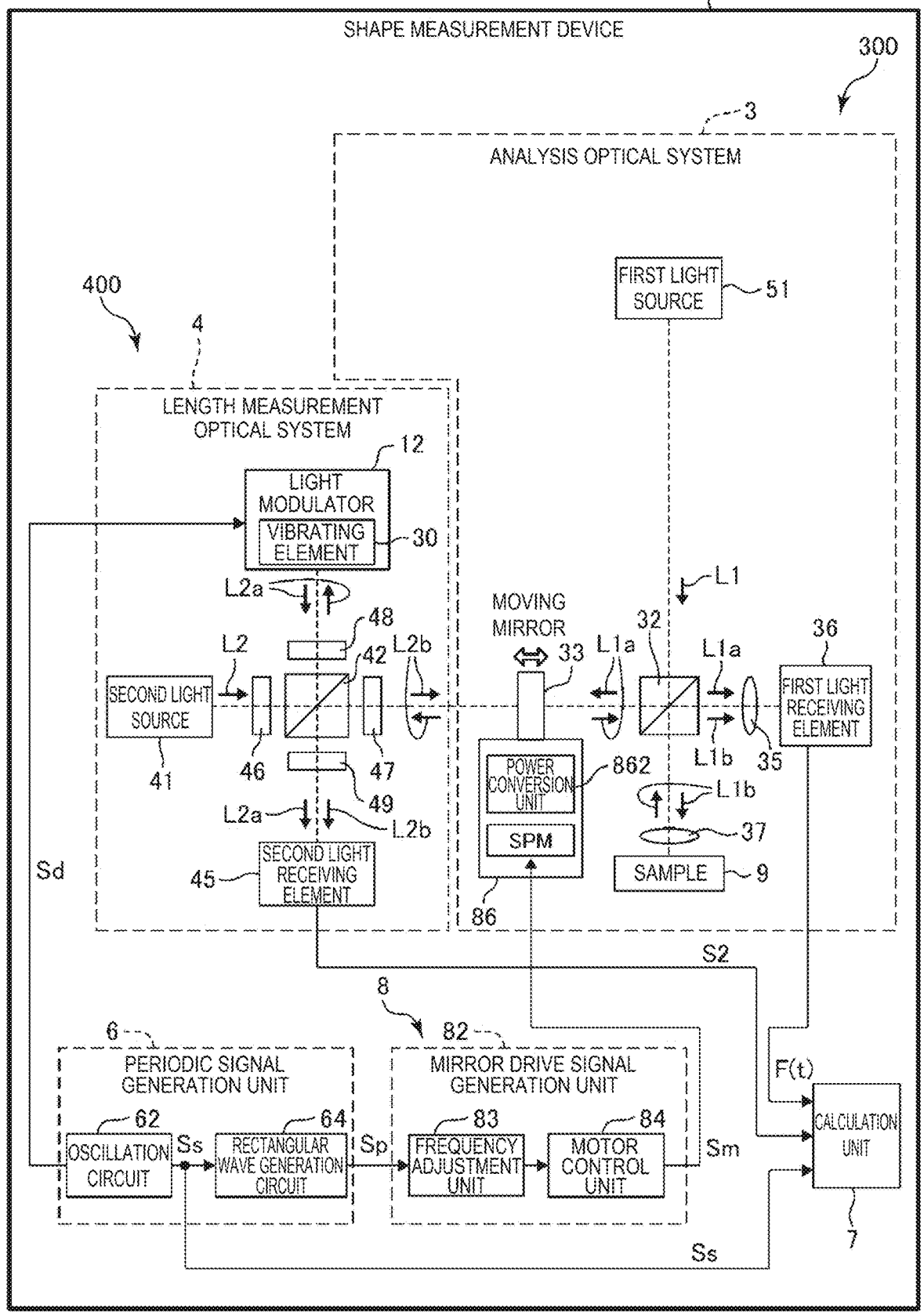
FIG. 11 is a schematic configuration diagram showing a shape measurement device as an interferometer according to a third embodiment.
Figure 12:
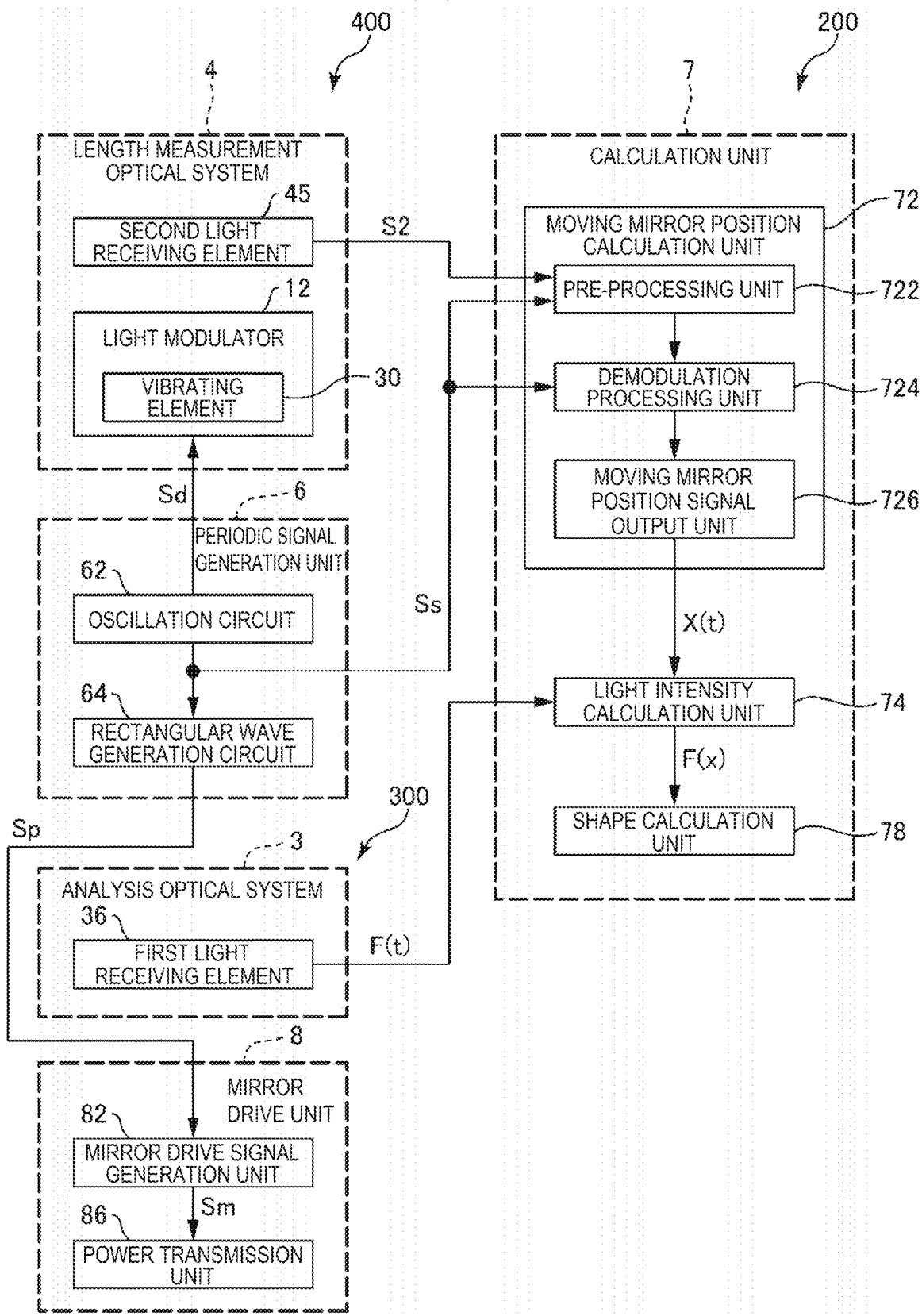
FIG. 12 is a schematic configuration diagram showing principal parts of an analysis unit, a length measurement unit, a periodic signal generation unit, and a calculation unit in FIG. 11.

FIG. 11 is a schematic configuration diagram showing a shape measurement device 200 as the interferometer according to the third embodiment. FIG. 12 is a schematic configuration diagram showing principal parts of the analysis unit 300, the length measurement unit 400, the periodic signal generation unit 6, and the calculation unit 7 in FIG. 11.

The third embodiment will hereinafter be described. In the following description, differences from the first embodiment will mainly be described, and the description of substantially the same matters will be omitted. It should be noted that in FIG. 11 and FIG. 12, the same reference symbols are given to matters substantially the same as those in the first embodiment.

The spectroscopic device 100 according to the first embodiment is a device that irradiates the sample 9 with the analysis light L1 emitted from the first light source 51 and performs the spectroscopic analysis on the sample 9. In contrast, the shape measurement device 200 according to the second embodiment is a device that irradiates the sample 9 with the analysis light L1 and performs the shape measurement of a surface and an inside of the sample 9. The shape measurement device 200 shown in FIG. 11 is substantially the same as the spectroscopic device 100 shown in FIG. 1 except that the configuration of the analysis optical system 3 is different.

The analysis optical system 3 shown in FIG. 11 includes the first light source 51, the beam splitter 32, the moving mirror 33, the condensing lens 35, a condensing lens 37, and the first light receiving element 36.

Examples of the first light source 51 shown in FIG. 11 include a white light source such as a super luminescent diode (SLD) and a light emitting diode (LED), a wavelength swept light source, and various lamps described in the first embodiment. Preferably, a broadband light source called a low-coherence light source is used.

The analysis light L1 emitted from the first light source 51 is split into two parts by the beam splitter 32. The beam splitter 32 shown in FIG. 11 reflects a part of the analysis light L1 toward the moving mirror 33 as the analysis light L1a and transmits the other part of the analysis light L1 toward the sample 9 as the analysis light L1b. The analysis light L1b is condensed on the sample 9 through the condensing lens 37.

In addition, the beam splitter 32 transmits the analysis light L1a reflected by the moving mirror 33 toward the first light receiving element 36, and reflects the analysis light L1b reflected by the sample 9 toward the first light receiving element 36. Therefore, the beam splitter 32 mixes the split analysis light L1a and L1b.

The first light receiving element 36 receives the interfering light and obtains an intensity thereof. A signal indicating a temporal change in intensity is output as a first received light signal F(t). The first received light signal F(t) includes the sample-derived component generated by the interaction between the analysis light L1b and the sample 9 and the phase information derived from the moving mirror 33 described above. The sample-derived component is, for example, a change in phase added to the analysis light L1b according to a surface shape of the sample 9.

Examples of the first light receiving element 36 include a photodiode, a phototransistor, and an image sensor such as a charge coupled device (CCD) and a complementary metal oxide semiconductor (CMOS). By using an image sensor, a two-dimensional distribution of the first received light signal F(t) can be obtained. Accordingly, the surface shape of the sample 9 can be two-dimensionally measured.

The length measurement optical system 4, the periodic signal generation unit 6, and the mirror drive unit 8 shown in FIG. 11 are the same as those in FIG. 1.

The calculation unit 7 shown in FIG. 12 includes the moving mirror position calculation unit 72, the light intensity calculation unit 74, and a shape calculation unit 78.

Similarly to the first embodiment described above, the light intensity calculation unit 74 shown in FIG. 12 generates a waveform (interferogram F(x)) representing the intensity of the first received light signal F(t) at each position of the moving mirror 33 based on the first received light signal F(t) and the moving mirror position signal X(t). The shape calculation unit 78 shown in FIG. 12 calculates the surface shape of the sample 9 based on the waveform. Specific analysis methods are known under names such as white light interference measurement method and time domain optical coherence tomography (OCT).

Although FIG. 11 shows when the sample 9 reflects the analysis light L1b, when the sample 9 transmits the analysis light L1b, the shape measurement device 200 shown in FIG. 11 can measure an internal shape (internal structure) of the sample 9. A specific analysis method is known by the name of optical coherence tomography or the like.

In the third embodiment described above, effects the same as those of the first embodiment can also be obtained.

4. Advantages Exerted by Embodiments

The spectroscopic device 100 and the shape measurement device 200 as the interferometer according to the embodiments described above each include the analysis unit 300 and the length measurement unit 400. The analysis unit 300 includes the analysis optical system 3 and the mirror drive unit 8. The analysis optical system 3 includes the moving mirror 33 that reflects the analysis light L1 and the first light receiving element 36 that receives the analysis light L1 and outputs a first received light signal, and is used for the analysis of the sample 9, that is, the spectroscopic analysis, the shape measurement, and so on of the sample 9 using the irradiation of the sample 9 with the analysis light L1 and the interference of the analysis light L1. The mirror drive unit 8 drives the moving mirror 33 based on the mirror drive signal Sm. The length measurement unit 400 includes the second light source 41 (laser source), the light modulator 12, and the second light receiving element 45. The second light source 41 emits the length measurement light L2 which is the laser beam. The light modulator 12 modulates the frequency of the length measurement light L2a using the vibrating element 30 and adds the modulation component. The second light receiving element 45 receives the length measurement light L2a, L2b including the length measurement component and the modulation component generated by irradiating the moving mirror 33 with the length measurement light L2b, and then outputs the second received light signal S2. Such a length measurement optical system 4 is used to detect the position of the moving mirror 33 using the interference of the length measurement light L2a, L2b. Further, in the interferometer according to the embodiment, the vibrating element 30 is the signal source of the mirror drive signal Sm.

According to such a configuration, the vibrating element 30 is used not only as the signal source of the reference signal Ss but also as the signal source of the mirror drive signal Sm. Therefore, it is unnecessary to prepare an individual signal source for each signal, and the reduction in size, the reduction in weight, and the reduction in power consumption of the interferometer (spectroscopic device 100 and shape measurement device 200) are achieved. In addition, since the number of the signal sources is reduced compared to the related art, the reduction in cost of the interferometer can be achieved.

Further, the spectroscopic device 100 and the shape measurement device 200 as the interferometer according to the embodiments described above further include the periodic signal generation unit 6. The periodic signal generation unit 6 generates a periodic signal using the vibrating element 30 as the signal source. Further, the mirror drive unit 8 includes the mirror drive signal generation unit 82. The mirror drive signal generation unit 82 adjusts the frequency of the periodic signal to generate the mirror drive signal Sm.

According to such a configuration, the mirror drive signal Sm having the desired drive frequency fk can be generated using the periodic signal originated from the vibrating element 30 as the signal source. Therefore, the moving speed of the moving mirror 33 can be adjusted as appropriate.

Further, the mirror drive signal generation unit 82 can be configured to adjust the frequency of the periodic signal to generate the timing signal.

According to such a configuration, it is possible to generate the timing signal suitable for a purpose such as timing control without preparing a new signal source.

Further, the length measurement unit 400 includes the demodulation processing unit 724. The demodulation processing unit 724 demodulates the length measurement component based on the periodic signal and the second received light signal S2.

According to such a configuration, the length measurement component can be demodulated using the periodic signal originated from the vibrating element 30 as the signal source. That is, in addition to the purpose of modulating the frequency of the length measurement light L2a, the vibrating element 30 can be used as the signal source of the reference signal Ss in the demodulation processing of demodulating the length measurement component. Accordingly, it is possible to achieve a further reduction in size, a further reduction in weight, a further reduction in power consumption, and a further reduction in cost of the interferometer.

Further, the mirror drive unit 8 can include the stepping motor SPM and the power conversion unit 862. The power conversion unit 862 moves the moving mirror 33 with the rotation output of the stepping motor SPM. Further, the mirror drive signal generation unit 82 includes the frequency adjustment unit 83 that adjusts the frequency of the periodic signal to output the pulse signal with the predetermined frequency, and the motor control unit 84 that generates the mirror drive signal Sm based on the pulse signal.

According to such a configuration, since the stepping motor SPM the rotational angle of which can accurately be controlled based on the number of pulses of the mirror drive signal Sm is used, the movement amount and the moving speed of the moving mirror 33 can accurately be controlled.

Further, the mirror drive unit 8 can include the DC motor DCM and the power conversion unit 862. The power conversion unit 862 moves the moving mirror 33 with the rotation output of the DC motor DCM. Further, the mirror drive signal generation unit 82 includes the frequency adjustment unit 83 that adjusts the frequency of the periodic signal to output the pulse signal with the predetermined frequency, and the F/V conversion unit 848 that converts the frequency of the pulse signal into the DC voltage.

According to such a configuration, the moving speed of the moving mirror 33 can easily be controlled since the DC motor DCM the rotation speed of which is easily controlled based on the DC voltage of the mirror drive signal Sm is used.

Further, the moving speed of the moving mirror 33 is denoted by v, the wavelength of the length measurement light L2a (laser beam) is denoted by λ, and the modulation frequency of the length measurement light L2 by the light modulator 12 is denoted by fm. At this time, it is preferable for the mirror drive unit 8 to drive the moving mirror 33 such that the moving speed v satisfies the following formula (3).

$$v < (fm/4)\lambda \quad (3)$$

According to such a configuration, the moving mirror 33 can be moved at the moving speed v at which the position of the moving mirror 33 can be measured. Therefore, it is possible to realize the interferometer capable of measuring the position of the moving mirror 33 with good reproducibility while achieving the reduction in size, the reduction in weight, and the reduction in power consumption.

Although the interferometer of the present disclosure has been described above based on the illustrated embodiments, the interferometer of the present disclosure is not limited to the above-described embodiments, and the configuration of each unit may be replaced with an appropriate constituent or may be added with any other constituent as appropriate.

Further, the interferometer of the present disclosure may include what is obtained by combining two or more of the embodiments described above. Further, each of the functional units provided to the spectroscopic device according to the present disclosure can be divided into a plurality of elements, or a plurality of functional units can be integrated into one.

Although a Michelson interference optical system is used in the above embodiments, other types of interference optical systems may be used.

Further, the arrangement of the sample is not limited to the illustrated arrangement. Since the sample-derived component is generated by applying the analysis light to the sample, the sample may be disposed at any position as long as the analysis light emitted from the sample is incident on the first light receiving element.

What is claimed is:

1. An interferometer comprising:
an analysis unit; and
a length measurement unit, wherein
the analysis unit includes
an analysis optical system that includes a first light source configured to emit an analysis light, a moving mirror configured to reflect the analysis light, and a first light receiving element configured to receive the analysis light and output a first received light signal, and that is configured to analyze a sample using interference of the analysis light, and
a mirror drive unit configured to drive the moving mirror based on a mirror drive signal,
the length measurement unit includes
a length measurement optical system that includes a laser source configured to emit a laser beam, a light modulator configured to add a modulation component by modulating a frequency of the laser beam using a vibrating element, and a second light receiving element configured to receive the laser beam including a length measurement component generated by irradiating the moving mirror with the laser beam, and the modulation component, and output a second received light signal, and that is configured to detect a position of the moving mirror using interference of the laser beam, and
the vibrating element is a signal source of the mirror drive signal.

2. The interferometer according to claim 1, further comprising:
a periodic signal generation unit configured to generate a periodic signal using the vibrating element as a signal source,
wherein the mirror drive unit includes a mirror drive signal generation unit configured to adjust a frequency of the periodic signal to generate the mirror drive signal.

3. The interferometer according to claim 2, wherein
the mirror drive signal generation unit is configured to adjust the frequency of the periodic signal to generate a timing signal.

4. The interferometer according to claim 2, wherein
the length measurement unit includes a demodulation processing unit configured to demodulate the length measurement component based on the periodic signal and the second received light signal.

5. The interferometer according to claim 2, wherein
the mirror drive unit includes
a stepping motor and
a power conversion unit configured to move the moving mirror with a rotation output of the stepping motor, and
the mirror drive signal generation unit includes
a frequency adjustment unit configured to adjust the frequency of the periodic signal to output a pulse signal with a predetermined frequency, and
a motor control unit configured to generate the mirror drive signal based on the pulse signal.

6. The interferometer according to claim 2, wherein
the mirror drive unit includes
a DC motor, and
a power conversion unit configured to move the moving mirror with a rotation output from the DC motor, and
the mirror drive signal generation unit includes
a frequency adjustment unit configured to adjust the frequency of the periodic signal to output a pulse signal with a predetermined frequency, and
an F/V conversion unit configured to convert a frequency of the pulse signal into a DC voltage.

7. The interferometer according to claim 1, wherein when moving speed of the moving mirror is denoted by v, a wavelength of the laser light is denoted by λ, and a modulation frequency of the t laser beam with the light modulator is denoted by fm, the mirror drive unit is configured to drive the moving mirror so that the moving speed v satisfies a following formula $$v < (fm/4)\lambda$$

* * * * *